US012780175B2

(12) United States Patent
Janga et al.

(10) Patent No.: US 12,780,175 B2
(45) Date of Patent: Nov. 3, 2026

(54) USE OF MODEL PREDICTED SPEED TO IMPROVE CONTROL OF ELECTRIFIED POWERTRAINS INCLUDING A TORQUE CONVERTER

(71) Applicant: FCA US LLC, Auburn Hills, MI (US)

(72) Inventors: Rakshith Kumar Janga, Auburn Hills, MI (US); Justin J Padinjaremury, Auburn Hills, MI (US); Ashay Sharma, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 51 days.

(21) Appl. No.: 19/064,773

(22) Filed: Feb. 27, 2025

(65) Prior Publication Data

US 2026/0249835 A1 Aug. 27, 2026

(51) Int. Cl.

| | |
|---|---|
| ***B60W 20/15*** | (2016.01) |
| ***B60W 10/06*** | (2006.01) |
| ***B60W 10/08*** | (2006.01) |
| ***B60W 30/188*** | (2012.01) |

(52) U.S. Cl.

CPC ............ *B60W 20/15* (2016.01); *B60W 10/06* (2013.01); *B60W 10/08* (2013.01); *B60W 30/188* (2013.01); *B60W 2400/00* (2013.01); *B60W 2510/0283* (2013.01); *B60W 2520/28* (2013.01); *B60W 2520/30* (2013.01); *B60W 2530/10* (2013.01); *B60W 2540/10* (2013.01); *B60W 2540/12* (2013.01); *B60W 2552/15* (2020.02); *B60W 2552/40* (2020.02); *B60W 2710/0666* (2013.01); *B60W 2710/083* (2013.01)

(58) Field of Classification Search

CPC ...... B60W 20/15; B60W 10/06; B60W 10/08; B60W 30/188; B60W 2552/40; B60W 2552/15; B60W 2400/00; B60W 2510/0283; B60W 2520/28; B60W 2520/30; B60W 2530/10; B60W 2540/10; B60W 2540/12; B60W 2710/0666; B60W 2710/083

See application file for complete search history.

(56) References Cited

U.S. PATENT DOCUMENTS

| | | | | |
|---|---|---|---|---|
| 8,631,891 | B2 | 1/2014 | Wilmanowicz et al. | |
| 10,960,883 | B2 | 3/2021 | Tamai et al. | |
| 11,073,198 | B1 * | 7/2021 | Magnus | F16H 48/20 |
| 11,628,817 | B2 | 4/2023 | Roy et al. | |
| 2021/0024072 | A1 * | 1/2021 | Zhao | B60W 10/023 |
| 2021/0276528 | A1 | 9/2021 | Choi et al. | |
| 2021/0317637 | A1 * | 10/2021 | Tanaka | B60W 10/00 |
| 2021/0354681 | A1 * | 11/2021 | Roy | F16H 63/50 |

* cited by examiner

*Primary Examiner* — Naeem Taslim Alam
(74) *Attorney, Agent, or Firm* — Jeremy J. Klobucar

(57) ABSTRACT

A torque control system and method for a vehicle include a control system configured to calculate a driver demand torque based on a speed of the vehicle and a driver torque request, predict a net driver demand torque based on the calculated driver demand torque and an opposing net torque for a road that the vehicle is traversing, estimate a turbine speed based on measured turbine and wheel speeds and a lumped vehicle inertia state space model with an observer correction algorithm, calculate a target actuator torque based on the calculated driver demand torque and the estimated turbine speed, and control at least one of an engine and an electric motor of the propulsion system based on the calculated target actuator torque.

20 Claims, 3 Drawing Sheets

USE OF MODEL PREDICTED SPEED TO IMPROVE CONTROL OF ELECTRIFIED POWERTRAINS INCLUDING A TORQUE CONVERTER

FIELD

The present application generally relates to vehicle torque converters and, more particularly, to techniques for using model predicted speed to improve control of electrified vehicle powertrains including a torque converter.

BACKGROUND

Torque converters are fluid couplings that are often utilized to connect/disconnect an engine/motor shaft from a transmission or driveline of a vehicle. Specifically, an impeller is driven by an input (i.e., the engine/motor shaft), which fluidly drives a turbine connected to an output (i.e., a transmission/driveline shaft). Speed sensors typically measure the input (impeller) and output (turbine) speeds to/from the torque converter for input to a torque converter model. Due to the nature of the indirect fluid coupling, the torque converter model aims to accurately predict their behavior in different driving conditions. An inaccurate or noisy measured turbine speed, in particular, could have a negative effect on the output of the torque converter model (an engine/motor control signal), which could result in reduced powertrain efficiency and/or increased driveline noise/vibration/harshness (NVH). Accordingly, while such conventional torque control systems do work for their intended purpose, there exists an opportunity for improvement in the relevant art.

SUMMARY

According to one aspect of the invention, a torque control system for a vehicle is presented. In one exemplary implementation, the torque control system comprises a set of sensors configured to measure a speed of a turbine of a torque converter of a propulsion system of the vehicle and a speed of a wheel of the vehicle, wherein the torque converter is arranged between the propulsion system and a drivetrain of the vehicle and a control system configured to calculate a driver demand torque based on a speed of the vehicle and a driver torque request, predict a net driver demand torque based on the calculated driver demand torque and an opposing net torque for a road that the vehicle is traversing, estimate the turbine speed based on the measured turbine and wheel speeds and a lumped vehicle inertia state space model with an observer correction algorithm, calculate a target actuator torque based on the calculated driver demand torque and the estimated turbine speed, and control at least one of an engine and an electric motor of the propulsion system based on the calculated target actuator torque.

In some implementations, the predicted net driver demand ($Trq_{NetPred}$) is calculated as:

$$Trq_{NetPred} = Trq_{Prop} - Trq_{FricBrake} - Trq_{RoadLoad} - Trq_{DrvRes}, \quad (1)$$

where:

$Trq_{Prop}$ represents an achievable propulsion torque of the propulsion system, $Trq_{DrvRes}$ represents a driving resistance of the vehicle, $Trq_{FricBrake}$ represents a friction brake torque, and $Trq_{RoadLoad}$ represents tire resistance and aero load. In some implementations, a value for $Trq_{RoadLoad}$ is calculated as follows:

$$Trq_{RoadLoad} = \left(A_{Coef} + B_{Coef} * Spd_{Veh} + C_{Coef} * Spd_{Veh}^2\right) * \text{Radius}_{Tire}, \quad (2)$$

where A, B, and C are calibration constants, $Spd_{Veh}$ is the speed of the vehicle. and $\text{Radius}_{Tire}$ is a tire radius of the vehicle.

In some implementations, the control system is further configured to calculate a delayed net driver demand torque based on the predicted net driver demand torque that accounts for system delays. In some implementations, the lumped vehicle inertia state space model is configured to model both predicted and delayed net wheel torques based on the predicted and net driver demand torques. In some implementations, the observer correction algorithm is configured to correct the modeled predicted and delayed net wheel torques based on predicted and delayed wheel speeds ($\omega_{WhiPred}$ and $\omega_{WhlDelayed}$, respectively) as follows:

$$\omega_{WhlPred} = \int\left(\frac{Trq_{NetPred}}{J_{DriveTrain} + m_{Veh} * r_{Tire}^2} + \alpha_{SpdErrCorr}\right), \text{ and} \quad (3)$$

$$\omega_{WhlDelayed} = \int\left(\frac{Trq_{NetDelayed}}{J_{DriveTrain} + m_{Veh} * r_{Tire}^2} + \alpha_{SpdErrCorr}\right), \quad (4)$$

where $\omega_{WhlMeas}$ represents the measured vehicle speed, $Trq_{NetPred}$ represents the modeled predicted net wheel torque, $Trq_{NetDelayed}$ represents the modeled delayed net wheel torque, $m_{Veh}$ represents the vehicle mass, $r_{Tire}$ represents the vehicle tire radius, and $\alpha_{SpdErrCorr}$ represents an error correction term of the observer correction algorithm.

In some implementations, the error correction term $\alpha_{SpdErrCorr}$ is calculated based on the measured wheel speed and a previous measured wheel speed and a tunable gain value for the observer correction algorithm. In some implementations, the net opposing torque includes a road load torque and a grade resistance torque. In some implementations, the driver torque request is based on at least one of an accelerator pedal position, a brake pedal position, and an autonomous vehicle control system, the road load torque is based on a road load equation, and the grade resistance torque is based on a road grade that the vehicle is traversing. In some implementations, the propulsion system includes both an engine and an electric motor, and wherein the control system is further configured to determine an optimal split of the calculated target actuator torque between the engine and the electric motor.

According to another aspect of the invention, a torque control method for a vehicle is presented. In one exemplary implementation, the torque control method comprises obtaining, by a set of sensors of the vehicle, a speed of a turbine of a torque converter of a propulsion system of the vehicle and a speed of a wheel of the vehicle, wherein the torque converter is arranged between the propulsion system and a drivetrain of the vehicle, calculating, by a control system of the vehicle. a driver demand torque based on a speed of the vehicle and a driver torque request, predicting, by the control system, a net driver demand torque based on the calculated driver demand torque and an opposing net torque for a road that the vehicle is traversing, estimating, by the control system, the turbine speed based on the measured turbine and wheel speeds and a lumped vehicle inertia state space model with an observer correction algorithm, calculating, by the control system, a target actuator torque based on the calculated driver demand torque and the estimated turbine speed, and controlling, by the control system, at least one of an engine and an electric motor of the propulsion system based on the calculated target actuator torque.

In some implementations, the predicted net driver demand ($Trq_{NetPred}$) is calculated as:

$$Trq_{NetPred} = Trq_{Prop} - Trq_{FricBrake} - Trq_{RoadLoad} - Trq_{DrvRes}, \quad (1)$$

where:

$Trq_{prop}$ represents an achievable propulsion torque of the propulsion system, $Trq_{DrvRes}$ represents a driving resistance of the vehicle, $Trq_{FricBrake}$ represents a friction brake torque, and $Trq_{RoadLoad}$ represents tire resistance and aero load. In some implementations, a value for $Trq_{RoadLoad}$ is calculated as follows:

$$Trq_{RoadLoad} = \left(A_{Coef} + B_{Coef} * Spd_{Veh} + C_{Coef} * Spd_{Veh}^2\right) * \text{Radius}_{Tire}, \quad (2)$$

where A, B, and C are calibration constants, $Spd_{Veh}$ is the speed of the vehicle. and $Radius_{Tire}$ is a tire radius of the vehicle.

In some implementations, the method further comprises calculating, by the control system, a delayed net driver demand torque based on the predicted net driver demand torque that accounts for system delays. In some implementations, the lumped vehicle inertia state space model is configured to model both predicted and delayed net wheel torques based on the predicted and net driver demand torques. In some implementations, the observer correction algorithm is configured to correct the modeled predicted and delayed net wheel torques based on predicted and delayed wheel speeds ($\omega_{WhlPred}$ and $\omega_{WhlDelayed}$, respectively) as follows:

$$\omega_{WhlPred} = \iint\left(\frac{Trq_{NetPred}}{J_{DriveTrain} + m_{Veh} + r_{Tire}^2} + \alpha_{SpdErrCorr}\right), \text{ and} \quad (3)$$

$$\omega_{WhlDelayed} = \iint\left(\frac{Trq_{NetDelayed}}{J_{DriveTrain} + m_{Veh} * r_{Tire}^2} + \alpha_{SpdErrCorr}\right), \quad (4)$$

where $\omega_{WhlMeas}$ represents the measured vehicle speed, $Trq_{NetPred}$ represents the modeled predicted net wheel torque, $Trq_{NetDelayed}$ represents the modeled delayed net wheel torque, $m_{Veh}$ represents the vehicle mass, $r_{Tire}$ represents the vehicle tire radius, and $\omega_{SpdErrCorr}$ represents an error correction term of the observer correction algorithm.

In some implementations, the error correction term $\alpha_{SpdErrCorr}$ is calculated based on the measured wheel speed and a previous measured wheel speed and a tunable gain value for the observer correction algorithm. In some implementations, the net opposing torque includes a road load torque and a grade resistance torque. In some implementations, the driver torque request is based on at least one of an accelerator pedal position, a brake pedal position, and at an autonomous vehicle control system, the road load torque is based on a road load equation, and the grade resistance torque is based on a road grade that the vehicle is traversing. In some implementations, the propulsion system includes both an engine and an electric motor, and wherein the control system is further configured to determine an optimal split of the calculated target actuator torque between the engine and the electric motor.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As previously discussed, due to the nature of its indirect fluid coupling, a torque converter model aims to accurately predict their behavior in different driving conditions. An inaccurate or noisy measured turbine speed, in particular, could have a negative effect on the output of the torque converter model (an engine/motor control signal), which could result in reduced powertrain efficiency and/or increased driveline noise/vibration/harshness (NVH). In particular, the measured turbine speed is highly susceptible to sensor noise, road noise, controller area network (CAN) latency issues and slow signal refresh rates, and uneven roads. Conventional solutions to this problem include filtering the measured turbine speed, increasing the sampling rate of the measured turbine speed, and/or using a different speed source to estimate the turbine speed. Filtering introduces a phase delay, an increased sample rate adds a load to the CAN bus, and other speed sources could suffer from some of these same issues (sensor noise, CAN latency and slow signal refresh rates, etc.).

Accordingly, improved torque control techniques for an electrified vehicle including a torque converter are presented herein. These techniques calculate an estimate turbine speed using a lumped vehicle inertia state space model along with an observer correction algorithm based on a predicted net driver demand torque. The predicted net driver demand torque is predicted based on a driver torque demand torque and an opposing net torque for a road that the vehicle is traversing (e., road load torque and grade resistance torque). The predicted net driver demand torque is input to a lumped vehicle inertia state space model with an observer correction (e.g., Kalman filter) algorithm. This model estimates the turbine speed, which is used in conjunction with the driver demand torque to calculate a target actuator torque (for actuation of an engine/motor, which are arranged at the input of the torque converter).

Figure 1:
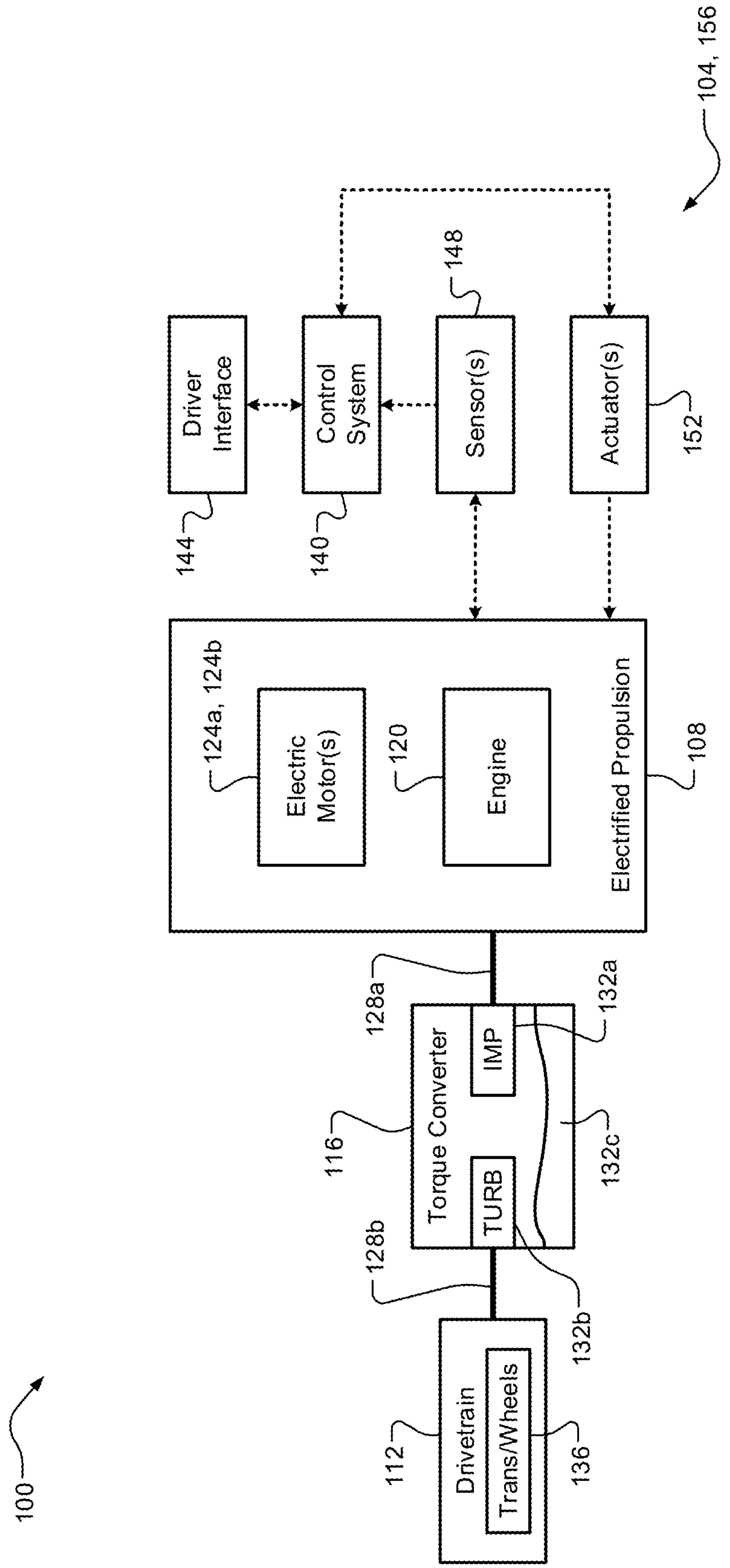
FIG. 1 is a diagram of a vehicle having a torque converter and an example torque control system according to the principles of the present application.

Referring now to FIG. 1, a diagram of an electrified vehicle 100 having an example torque control system 104 according to the principles of the present application are illustrated. While hybrid and fully electrified configurations of the electrified vehicle 100 are specifically shown and described herein, it will be appreciated that the vehicle 100 could also have a conventional engine-only configuration. The electrified vehicle 100 generally comprises an electrified propulsion system 108 configured to generate and transfer torque to a drivetrain 112 of the electrified vehicle 100 for vehicle propulsion. A fluid coupling or torque converter 116 is arranged between the electrified propulsion system 108 and the drivetrain 112. As shown, the electrified propulsion system 108 includes an engine 120 and at least one electric motor 124 (e.g., a first electric motor 124*a* configured as a belt-driven starter-generator, or BSG for the engine 120). The engine 120 and the electric motor(s) 124 generate drive torque at an input shaft 128*a* connected to an impeller 132*a* of the torque converter 116. The electric motor(s) 124 is/are powered by electrical energy supplied by a high voltage battery system (not shown).

Within the torque converter 116, the impeller 132*a* fluidly drives (e.g., via a transmission fluid 132*c*) a turbine 132*b* of the torque converter 116, which is connected to a driveline shaft or transmission input shaft 128*b*. The driveline shaft or transmission input shaft 128*b* drives (e.g., via a differential, the transmission, or a combination thereof) a transmission or a front axle/wheels (generally referenced as 136) of the drivetrain 112. In some example embodiments, the electrified propulsion system 108 further comprises a second electric motor 124*b* that generates drive torque at a rear axle or rear wheels (not shown) of the drivetrain 112. In some example embodiments, the electrified propulsion system 108 includes the second electric motor 124*b* but not the first electric motor 124 (i.e., no BSG configuration). In some example embodiments, the electrified propulsion system 108 includes only the first electric motor 124*a* or both the first and second electric motors 124 but no engine 120. In yet other example embodiments, the electrified propulsion system 108 only includes the engine 120. A control system 140 controls operation of the electrified vehicle 100, which primarily includes controlling the electrified propulsion system 108 to generate a sufficient amount of drive torque to satisfy a driver torque request.

It will be appreciated that the techniques of the present application can be particularly applicable to electrified (i.e., hybrid or electric-only vehicles). This is because in conventional engine-only vehicles, the torque response is much slower compared to that of an electrified vehicle. Thus, conventional engine-only vehicles would not benefit as much from utilizing the torque converter modeling techniques of the present application. In electrified vehicles, however, including engines driven by a BSG, the electric motor responsiveness is much faster and thus the torque changes that occur in the system can be modeled using the torque converter modeling techniques of the present application, thereby more noticeable improving the drivability (i.e., reduced NVH) in electrified vehicles having torque converters compared to conventional engine-only vehicles having torque converters.

The driver torque request can be provided by a driver of the electrified vehicle 100 via a driver interface 144, which can include an accelerator pedal, a brake pedal, and/or autonomous vehicle control systems (cruise control, adaptive cruise control, etc.). For example, the brake pedal could be used to control regenerative torque. A set of one or more sensors 148 are configured to measure various operating parameters of the electrified vehicle 100, including component positions/speeds/accelerations (e.g., turbine speed and wheel speed), temperatures, and the like. A set of one or more actuators 152 are also configured to control actuation of the various torque generating systems of the electrified propulsion system 108 (air/fuel/spark of engine 120, inverter switching for phase currents for electric motor(s) 124 and using the high voltage battery system, etc.). The control system 140 can be configured to communicate with these devices/systems 144, 148, 152 via a CAN (shown as 156). In one example embodiment, the control system 140 is configured to optimize a split between engine and electric motor torque to achieve a driver demand torque. The control system 140 is also configured to perform at least some of the torque control techniques of the present application, which will now be described in greater detail.

Figure 2:
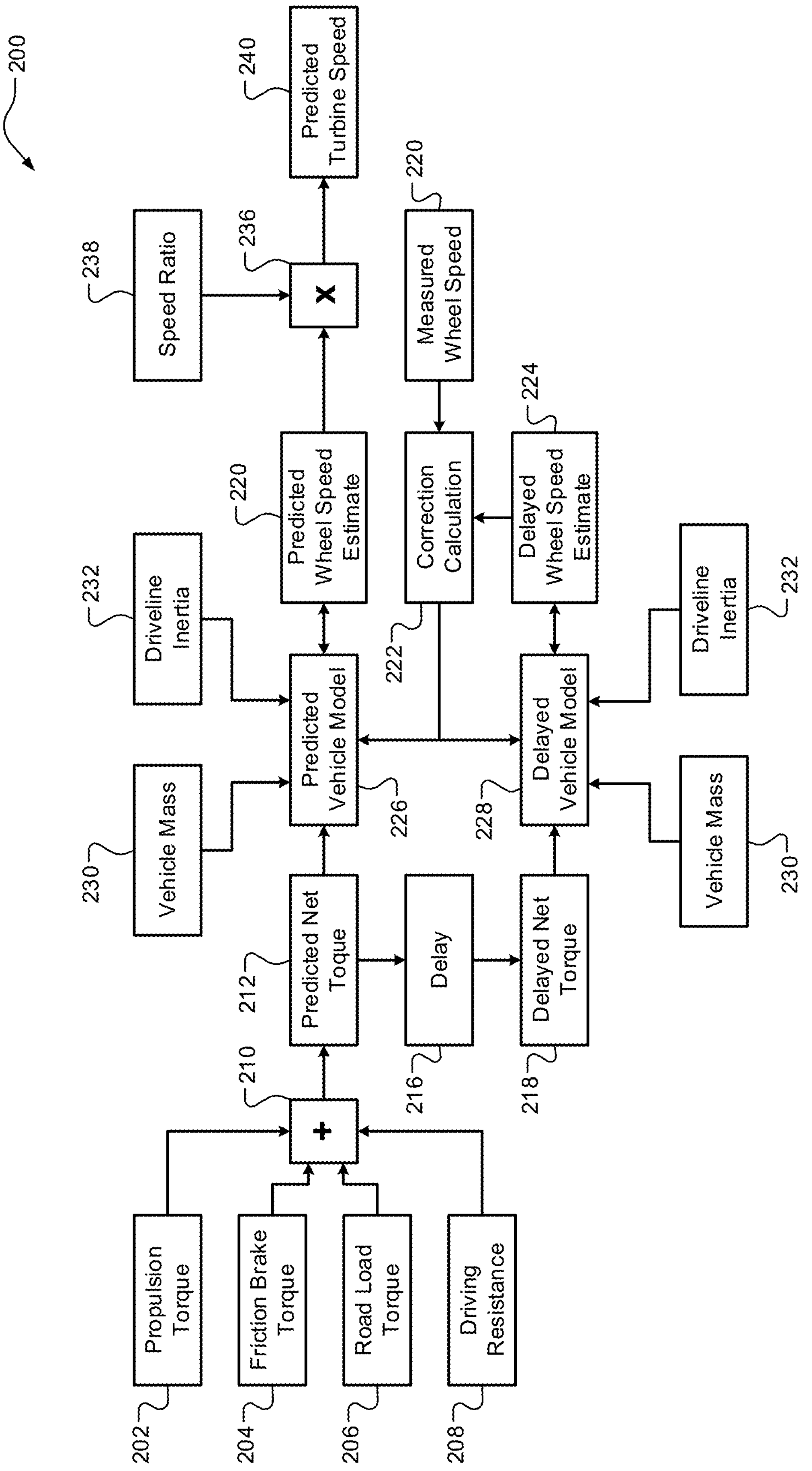
FIG. 2 is a functional block diagram of an example system architecture for the torque control system according to the principles of the present application.

Referring now to FIG. 2 and with continued reference to FIG. 1, a functional block diagram of an example system architecture 200 for the torque control system 104 according to the principles of the present application is illustrated. For example, the system architecture 200 could represent an algorithm or software that is executable by the control system 140. A first calculation is a net wheel torque calculation. The main goal here is to sum of all the torques at the wheel to calculate a predicted net torque $Trq_{NetPred}$ (indicated by blocks 202-212):

$$Trq_{NetPred} = Trq_{Prop} - Trq_{FricBrake} - Trq_{RoadLoad} - Trq_{DrvRes}, \tag{1}$$

where:

- $Trq_{Prop}$ is the achievable propulsion torque and Includes positive and negative torque from the components of the electrified propulsion system 108 (engine 120, electric motor(s) 124, etc.);
- $Trq_{DrvRes}$ represents the driving resistance of the vehicle 100;
- $Trq_{RoadLoad}$ represents tire resistance and aero load and can be calculated as follows:

$$Trq_{RoadLoad} = (A_{Coef} + B_{Coef} * Spd_{Veh} + C_{Coef} * Spd_{Veh}^2) * \text{Radius}_{Tire}, \tag{2}$$

where A, B, and Care calibration constants, $Spd_{Veh}$ is vehicle speed (e.g., in meters per second, or m/s), and $Radius_{Tire}$ is a tire radius; and $Trq_{FricBrake}$ is the friction brake torque.

To account for network or CAN latencies, processing delays, and actuation delays between torque command and vehicle speed response, we also calculate a delayed net torque $Trq_{NetDelay}$ as follows (indicated by blocks 216-218):

$$Trq_{NetDelayed} = \text{Delay}[Trq_{NetPred}, \text{Delay Calibration}], \tag{3}$$

where the Delay Calibration is based on the known delays in the system. A raw predicted vehicle speed calculation involves the use of a simple rigid body model to calculate a delayed wheel speed ($\omega_{WhlDelayed_{Raw}}$) and predicted rotational wheel speed ($\omega_{WhlPred_{Raw}}$) from the two net torques (indicated by blocks 226-232):

$$\omega_{WhlPred_{Raw}} = \int \frac{Trq_{NetPred}}{J_{DriveTrain} + m_{Veh} * r_{Tire}^2}, \text{ and} \tag{4}$$

-continued $$\omega_{WhlDelayed_{Raw}} = \int \frac{Trq_{NetDelayed}}{J_{DriveTrain} + m_{Veh} * r_{Tire}^2}, \quad (5)$$

where $J_{DriveTrain}$ is the total net rotational inertia from the electrified propulsion system 108 that is a function of the current transmission gear, drive shafts, and other rotational components that resist the angular acceleration of the propulsion system, $m_{Veh}$ is the vehicle mass, and $r_{Tire}$ is the tire radius of the vehicle 100.

Since there can be multiple factors that we may not account for correctly (mass, grade, stiffness, etc.), the outputs of both models 226, 228 are corrected based on the measured vehicle speed ($\omega_{WhlMeas}$) as indicated by blocks 220-224):

$$\omega_{WhlPred} = \int\left(\frac{Trq_{NetPred}}{J_{DriveTrain} + m_{Veh} * r_{Tire}^2} + \alpha_{SpdErrCorr}\right), \text{ and} \quad (6)$$

$$\omega_{WhlDelayed} = \int\left(\frac{Trq_{NetDelayed}}{J_{DriveTrain} + m_{Veh} * r_{Tire}^2} + \alpha_{SpdErrCorr}\right), \quad (7)$$

where:

$$\alpha_{SpdErrCorr} = f[\omega_{WhlMeas}, \omega_{WhlDelayed}]. \quad (8)$$

In one exemplary implementation, the following simple function could be utilized:

$$\alpha_{SpdErrCorr} = \text{Gain}_{SpdErr} * (\omega_{WhlMeas} - \omega_{WhlDelayed}). \quad (9)$$

More specifically, the measured wheel speed (block 220) is compared to the delayed wheel speed (block 224) since that accounts for the delays in the speed we expect. The predicted wheel speed estimate (block 220) generated by the model 226 will lead the measured speed by the amount we delayed the net torque.

Finally, we will then convert the wheel speed to the turbine speed using the speed ratio $\text{Ratio}_{Spd}$ (indicated by block 238). The speed ratio is normally calculated based on the Axle Ratio ($\text{Ratio}_{FDR}$), Transfer Case Ratio ($\text{Ratio}_{TCase}$) and the Current Gear Speed Ratio ($\text{Ratio}_{CurrentGed}$) which is usually a fixed value based on the gear when not in a shift, else it is based on the ratio of the measured turbine speed ($\omega_{Turbine}$) and measured transmission output speed ($\omega_{TransOuput}$) during a shift. More specifically, when not in a shift:

$$\text{Ratio}_{Spd} = \text{Ratio}_{FDR} * \text{Ratio}_{TCase} * \text{Ratio}_{CurrentGear} \quad (10), \text{ and}$$

when in a shift:

$$\text{Ratio}_{Spd} = \text{Ratio}_{FDR} * \text{Ratio}_{TCase} * \frac{\omega_{Turbine}}{\omega_{TransOutput}}. \quad (11)$$

The final equation predicted turbine speed (indicated by blocks 236-240) is thus calculated using Equation (11) below:

$$\omega_{SpdPred} = \text{Ratio}_{Spd} * \omega_{WhlPred} = \text{Ratio}_{Spd} \int\left(\frac{Trq_{NetPred}}{J_{DriveTrain} + m_{Veh} * r_{Tire}^2} + \alpha_{SpdErrCorr}\right).$$

Figure 3:
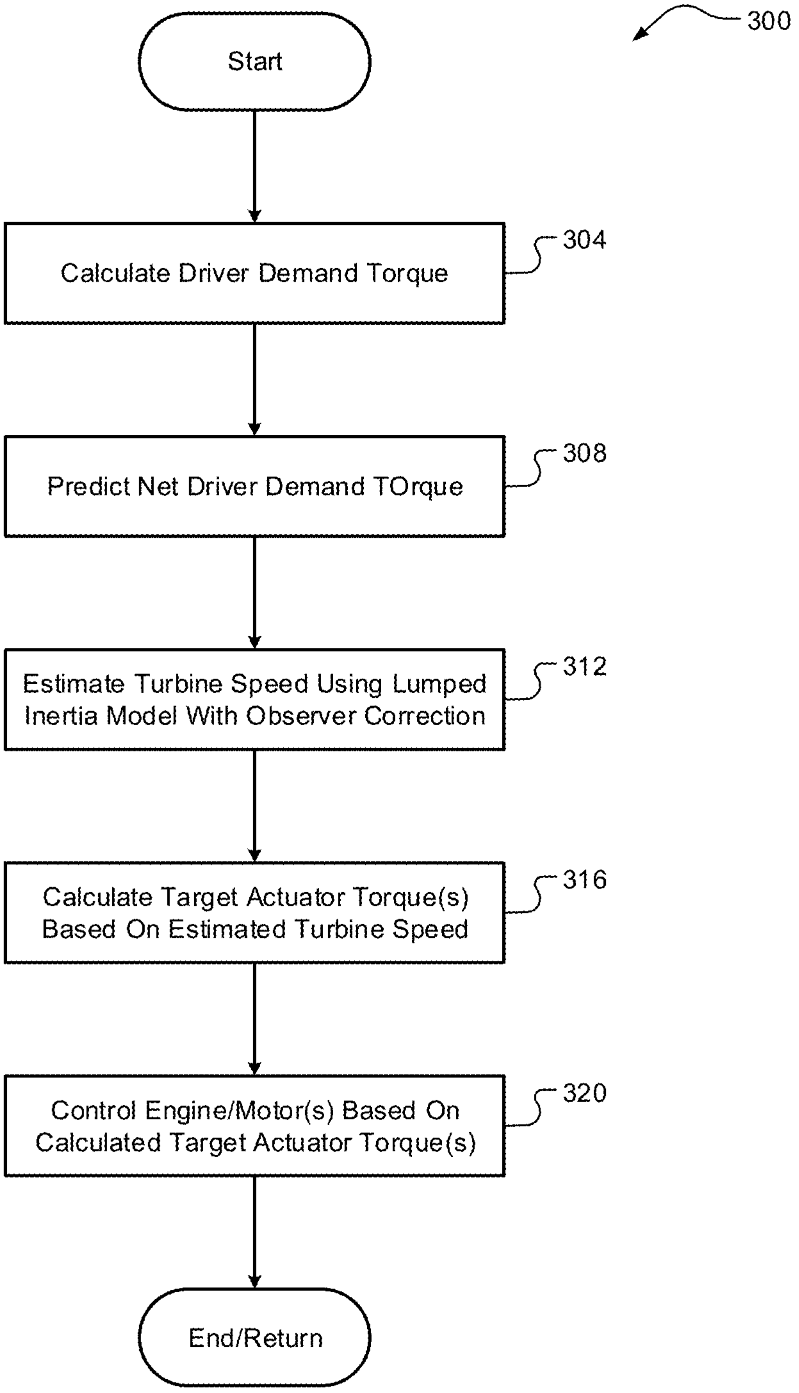
FIG. 3 is a flow diagram of an example torque control method for a vehicle having a torque converter according to the principles of the present application.

Referring now to FIG. 3 and with continued reference to FIGS. 1-2, a flow diagram of an example torque control method 300 for an electrified vehicle according to the principles of the present application. While the method 300 specifically references the electrified vehicle 100 and its components, it will be appreciated that the method 300 could also be applicable to other suitably-configured vehicles. The method 300 begins at 304. At 304, the control system 140 calculates a driver demand torque based on a speed of the vehicle 100 and a driver torque request. At 308, the control system 140 predicts a net driver demand torque based on the calculated driver demand torque and an opposing net torque for a road that the vehicle 100 is traversing. At 312, the control system 140 estimates the turbine speed based on the measured turbine and wheel speeds and a lumped vehicle inertia state space model with an observer correction algorithm. At 316, the control system 140 calculates a target actuator torque based on the calculated driver demand torque and the estimated turbine speed. Finally, at 320, the control system 140 controls at least one of the engine 120 and the electric motor(s) 124 of the electrified propulsion system 108 based on the calculated target actuator torque. The method 300 then ends or returns to 304.

It will be appreciated that the terms "controller" and "control system" as used herein refer to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A torque control system for a vehicle, the torque control system comprising:
- a set of sensors configured to measure a speed of a turbine of a torque converter of a propulsion system of the vehicle and a speed of a wheel of the vehicle, wherein the torque converter is arranged between the propulsion system and a drivetrain of the vehicle; and
- a control system configured to:
  - calculate a driver demand torque based on a speed of the vehicle and a driver torque request;
  - predict a net driver demand torque based on the calculated driver demand torque and an opposing net torque for a road that the vehicle is traversing;
  - estimate the turbine speed based on the measured turbine and wheel speeds and a lumped vehicle inertia state space model with an observer correction algorithm;

calculate a target actuator torque based on the calculated driver demand torque and the estimated turbine speed; and control at least one of an engine and an electric motor of the propulsion system based on the calculated target actuator torque.

2. The torque control system of claim 1, wherein the predicted net driver demand ($Trq_{NetPred}$) is calculated as:

$$Trq_{NetPred} = Trq_{Prop} - Trq_{FricBrake} - Trq_{RoadLoad} - Trq_{DrvRes}, \quad (1)$$

where:

$Trq_{Prop}$ represents an achievable propulsion torque of the propulsion system, $Trq_{DrvRes}$ represents a driving resistance of the vehicle, $Trq_{FricBrake}$ represents a friction brake torque, and $Trq_{RoadLoad}$ represents tire resistance and aero load.

3. The torque control system of claim 2, wherein a value for $Trq_{RoadLoad}$ is calculated as follows:

$$Trq_{RoadLoad} = (A_{Coef} + B_{Coef} * Spd_{Veh} + C_{Coef} * Spd_{Veh}^2) * \text{Radius}_{Tire}, \quad (2)$$

where A, B, and C are calibration constants, $Spd_{Veh}$ is the speed of the vehicle, and $Radius_{Tire}$ is a tire radius of the vehicle.

4. The torque control system of claim 1, wherein the control system is further configured to calculate a delayed net driver demand torque based on the predicted net driver demand torque that accounts for system delays.

5. The torque control system of claim 4, wherein the lumped vehicle inertia state space model is configured to model both predicted and delayed net wheel torques based on the predicted and net driver demand torques.

6. The torque control system of claim 5, wherein the observer correction algorithm is configured to correct the modeled predicted and delayed net wheel torques based on predicted and delayed wheel speeds ($\omega_{WhlPred}$ and $\omega_{WhlDelayed}$, respectively) as follows:

$$\omega_{WhlPred} = \int\left(\frac{Trq_{NetPred}}{J_{DriveTrain} + m_{Veh} * r_{Tire}^2} + \alpha_{SpdErrCorr}\right), \text{ and} \quad (3)$$

$$\omega_{WhlDelayed} = \int\left(\frac{Trq_{NetDelayed}}{J_{DriveTrain} + m_{Veh} * r_{Tire}^2} + \alpha_{SpdErrCorr}\right), \quad (4)$$

where $\omega_{WhlMeas}$ represents the measured vehicle speed, $Trq_{NetPred}$ represents the modeled predicted net wheel torque, $Trq_{NetDelayed}$ represents the modeled delayed net wheel torque, $m_{Veh}$ represents the vehicle mass, $r_{Tire}$ represents the vehicle tire radius, and $\alpha_{SpdErrCorr}$ represents an error correction term of the observer correction algorithm.

7. The torque control system of claim 6, wherein the error correction term $\alpha_{SpdErrCorr}$ is calculated based on the measured wheel speed and a previous measured wheel speed and a tunable gain value for the observer correction algorithm.

8. The torque control system of claim 1, wherein the net opposing torque includes a road load torque and a grade resistance torque.

9. The torque control system of claim 1, wherein the driver torque request is based on at least one of an accelerator pedal position, a brake pedal position, and an autonomous vehicle control system, the road load torque is based on a road load equation, and the grade resistance torque is based on a road grade that the vehicle is traversing.

10. The torque control system of claim 1, wherein the propulsion system includes both the engine and the electric motor, and wherein the control system is further configured to determine an optimal split of the calculated target actuator torque between the engine and the electric motor.

11. A torque control method for a vehicle, the torque control method comprising:

obtaining, by a set of sensors of the vehicle, a speed of a turbine of a torque converter of a propulsion system of the vehicle and a speed of a wheel of the vehicle, wherein the torque converter is arranged between the propulsion system and a drivetrain of the vehicle;

calculating, by a control system of the vehicle, a driver demand torque based on a speed of the vehicle and a driver torque request;

predicting, by the control system, a net driver demand torque based on the calculated driver demand torque and an opposing net torque for a road that the vehicle is traversing;

estimating, by the control system, the turbine speed based on the measured turbine and wheel speeds and a lumped vehicle inertia state space model with an observer correction algorithm;

calculating, by the control system, a target actuator torque based on the calculated driver demand torque and the estimated turbine speed; and controlling, by the control system, at least one of an engine and an electric motor of the propulsion system based on the calculated target actuator torque.

12. The torque control method of claim 11, wherein the predicted net driver demand ($Trq_{NetPred}$) is calculated as:

$$Trq_{NetPred} = Trq_{Prop} - Trq_{FricBrake} - Trq_{RoadLoad} - Trq_{DrvRes}, \quad (1)$$

where:

$Trq_{Prop}$ represents an achievable propulsion torque of the propulsion system, $Trq_{DrvRes}$ represents a driving resistance of the vehicle, $Trq_{FricBrake}$ represents a friction brake torque, and $Trq_{RoadLoad}$ represents tire resistance and aero load.

13. The torque control method of claim 12, wherein a value for $Trq_{RoadLoad}$ is calculated as follows:

$$Trq_{RoadLoad} = (A_{Coef} + B_{Coef} * Spd_{Veh} + C_{Coef} * Spd_{Veh}^2) * \text{Radius}_{Tire}, \quad (2)$$

where A, B, and C are calibration constants, $Spd_{Veh}$ is the speed of the vehicle, and $Radius_{Tire}$ is a tire radius of the vehicle.

14. The torque control method of claim 11, further comprising calculating, by the control system, a delayed net driver demand torque based on the predicted net driver demand torque that accounts for system delays.

15. The torque control method of claim 14, wherein the lumped vehicle inertia state space model is configured to model both predicted and delayed net wheel torques based on the predicted and net driver demand torques.

16. The torque control method of claim 15, wherein the observer correction algorithm is configured to correct the modeled predicted and delayed net wheel torques based on predicted and delayed wheel speeds ($\omega_{WhlPred}$ and $\omega_{WhlDelayed}$, respectively) as follows:

$$\omega_{WhlPred} = \int\left(\frac{Trq_{NetPred}}{J_{DriveTrain} + m_{Veh} * r_{Tire}^2} + \alpha_{SpdErrCorr}\right), \text{ and} \quad (3)$$

$$\omega_{WhlDelayed} = \int\left(\frac{Trq_{NetDelayed}}{J_{DriveTrain} + m_{Veh} * r_{Tire}^2} + \alpha_{SpdErrCorr}\right), \quad (4)$$

where $\omega_{WhlMeas}$ represents the measured vehicle speed, $Trq_{NetPred}$ represents the modeled predicted net wheel torque, $Trq_{NetDelayed}$ represents the modeled delayed net wheel torque, $m_{Veh}$ represents the vehicle mass, $r_{Tire}$ represents the vehicle tire radius, and $\alpha_{SpdErrCorr}$ represents an error correction term of the observer correction algorithm.

17. The torque control method of claim 16, wherein the error correction term $\alpha_{SpdErrCorr}$ is calculated based on the measured wheel speed and a previous measured wheel speed and a tunable gain value for the observer correction algorithm.

18. The torque control method of claim 11, wherein the net opposing torque includes a road load torque and a grade resistance torque.

19. The torque control method of claim 11, wherein the driver torque request is based on at least one of an accelerator pedal position, a brake pedal position, and at an autonomous vehicle control system, the road load torque is based on a road load equation, and the grade resistance torque is based on a road grade that the vehicle is traversing.

20. The torque control method of claim 11, wherein the propulsion system includes both the engine and the electric motor, and wherein the control system is further configured to determine an optimal split of the calculated target actuator torque between the engine and the electric motor.

* * * * *